United States Patent
Okuyama et al.

[11] Patent Number: 5,394,900
[45] Date of Patent: Mar. 7, 1995

[54] PRESSURE REGULATING VALVE

[75] Inventors: Shouhei Okuyama, Okazaki; Masaaki Tanaka, Tsu, both of Japan

[73] Assignee: Nippondenso Co., Ltd., Kariya, Japan

[21] Appl. No.: 153,951

[22] Filed: Nov. 18, 1993

[30] Foreign Application Priority Data

Dec. 15, 1992 [JP] Japan .................................. 4-334283
Jun. 21, 1993 [JP] Japan .................................. 5-149254

[51] Int. Cl.⁶ ............................................. F16K 7/07
[52] U.S. Cl. .................................... 137/510; 123/463; 251/335.3
[58] Field of Search ...................... 137/510; 251/335.3; 123/459, 463

[56] References Cited

U.S. PATENT DOCUMENTS

| | | | |
|---|---|---|---|
| 4,359,204 | 11/1982 | Williams | 251/335.3 X |
| 4,421,295 | 12/1983 | Parkison | 251/335.3 X |
| 4,431,026 | 2/1984 | Fehrenbach et al. | 137/510 |
| 4,753,570 | 6/1988 | Jarvis | 137/510 X |
| 4,869,219 | 9/1989 | Bremmer et al. | 123/463 X |

FOREIGN PATENT DOCUMENTS

62-3164 1/1987 Japan .
62-131963 6/1987 Japan .
62-225763 10/1987 Japan .
63-87377 6/1988 Japan .

*Primary Examiner*—Stephen M. Hepperle
*Attorney, Agent, or Firm*—Cushman, Darby & Cushman

[57] ABSTRACT

A pressure regulating valve comprises a bellows formed in the shape of a bottomed cylinder, a valve seat disposed opposite to a bottom portion of the bellows, a valve body provided on an outside of the bottom portion of the bellows so as to come in and out of contact with the valve seat due to expansion and contraction of the bellows, a valve body retaining meter provided on the outside of the bottom portion of the bellows and having an engaging portion used for the engagement with an outer peripheral wall portion of the bellows, the valve body retaining member serving to retain the valve body at the bottom portion of the bellows by being fixed to the outer periphery of the bottom portion of the bellows by means of the engaging portion, and a reinforcing member provided inside of the bottom portion of the bellows and located so as to be opposite to the engaging portion through a peripheral wall portion of the bellows.

15 Claims, 10 Drawing Sheets

PRESSURE REGULATING VALVE

FIELD OF THE INVENTION

The present invention relates to a pressure regulating valve which serves to release part of pressurized fluid to a low pressure side so as to regulate the fluid pressure to a predetermined pressure.

DESCRIPTION OF THE PRIOR ART

A pressure regulating valve of bellows type disclosed in Japanese Utility Model Unexamined Publication No. 63-87377 is shown in FIG. 12.

This valve is constructed such that a fixed valve seat 2 is secured in a cylindrical valve body 1 and a resinous bellows 3 formed in the shape of a bottomed cylinder is provided above the fixed valve seat 2. A ball valve retainer 5 is fitted on a bottom portion 4 of the bellows 3 so that a ball valve 6 is retained by the ball valve retainer 5. A spring 7 is disposed in the bellows 3 so as to serve to press the ball valve 6 against the fixed valve seat 2 through the bottom portion of the bellows 3.

With such construction, the valve is opened when a differential pressure acting on the bellows 3 exceeds the set force of the spring 7 while it is closed when the differential pressure becomes less than the set force. Thus, the pressure of the fuel in the valve body 1 can be maintained at a predetermined value.

In such pressure regulating valve that uses the resinous bellows, it has been difficult to maintain the strength of the resinous bellows.

Further, there has been another problem that since the resinous bellows is caused to expand and contract greatly due to the change of temperature, if the volume of the resinous member is large the pressure regulating characteristic is varied with the temperature change.

SUMMARY OF THE INVENTION

An object of the present invention is to provide an improved pressure regulating valve which overcomes the above problems of the prior art.

Another object of the present invention is to reinforce the resinous bellows.

Still another object of the present invention is to reduce the volume of the resin material of the resinous bellows.

Still another object of the present invention is to reduce the volume of the resin material of the resinous bellows while maintaining the strength of the resinous bellows.

Still another object of the present invention is to fix a movable valve to the resinous bellows with reliability.

Still another object of the present invention is to securely attach the resinous bellows to a main body.

According to the construction of a pressure regulating valve of the present invention, a resinous bellows expands and contracts in the axial direction in accordance with the pressure of fluid. This causes a valve body retained in a bottom portion of a bellows by means of a valve body retaining member to come in contact with and separate from a valve seat to thereby regulate outflow of fluid, with a result that the fluid pressure can be regulated to a desired pressure.

A cylinder member is located inside of the bottom portion of the bellows so as to be opposite to an engaging portion of the valve body-retaining member through peripheral wall of the bottom portion of the bellows. Therefore, the bottom portion of the bellows is particularly reinforced in the radial direction. In consequence, the resinous bellows can obtain a high strength against the engagement of the engaging portion with the outer periphery of the bottom portion of the bellows.

In particular, it is desirable that the cylinder member to be disposed inside of the bottom portion of the bellows is formed in a unit body with a spring seat serving to receive a spring used for biasing the bellows in the direction of expansion. By so doing, it is possible to reinforce the bellows without increasing the number of component parts.

Further, by reinforcing the bottom portion of the bellows, a resin material of the bellows can be reduced in thickness and volume.

Moreover, according to another construction, since a cylinder member is provided inside of an opening end of the bellows, it is possible to obtain a sufficient strength in fixing the opening end of the bellows.

Particularly, it is desirable that the cylinder member for reinforcing the opening end of the bellows is formed in a unit body with a plate which serves to define an axial position of the bellows. By so doing, it is possible with a simple structure to achieve the locating of the opening end of the bellows in the axial direction and the reinforcement of the opening end of the bellows in the radial direction.

In addition, by reinforcing the opening end of the bellows, the resin material of the bellows can be reduced in thickness and volume.

DESCRIPTION OF PREFERRED EMBODIMENTS

Description will be given below of preferred embodiments in which a pressure regulating valve according to the present invention is used as a fuel pressure regulating valve of a spark ignition type internal combustion engine.

Figure 1:
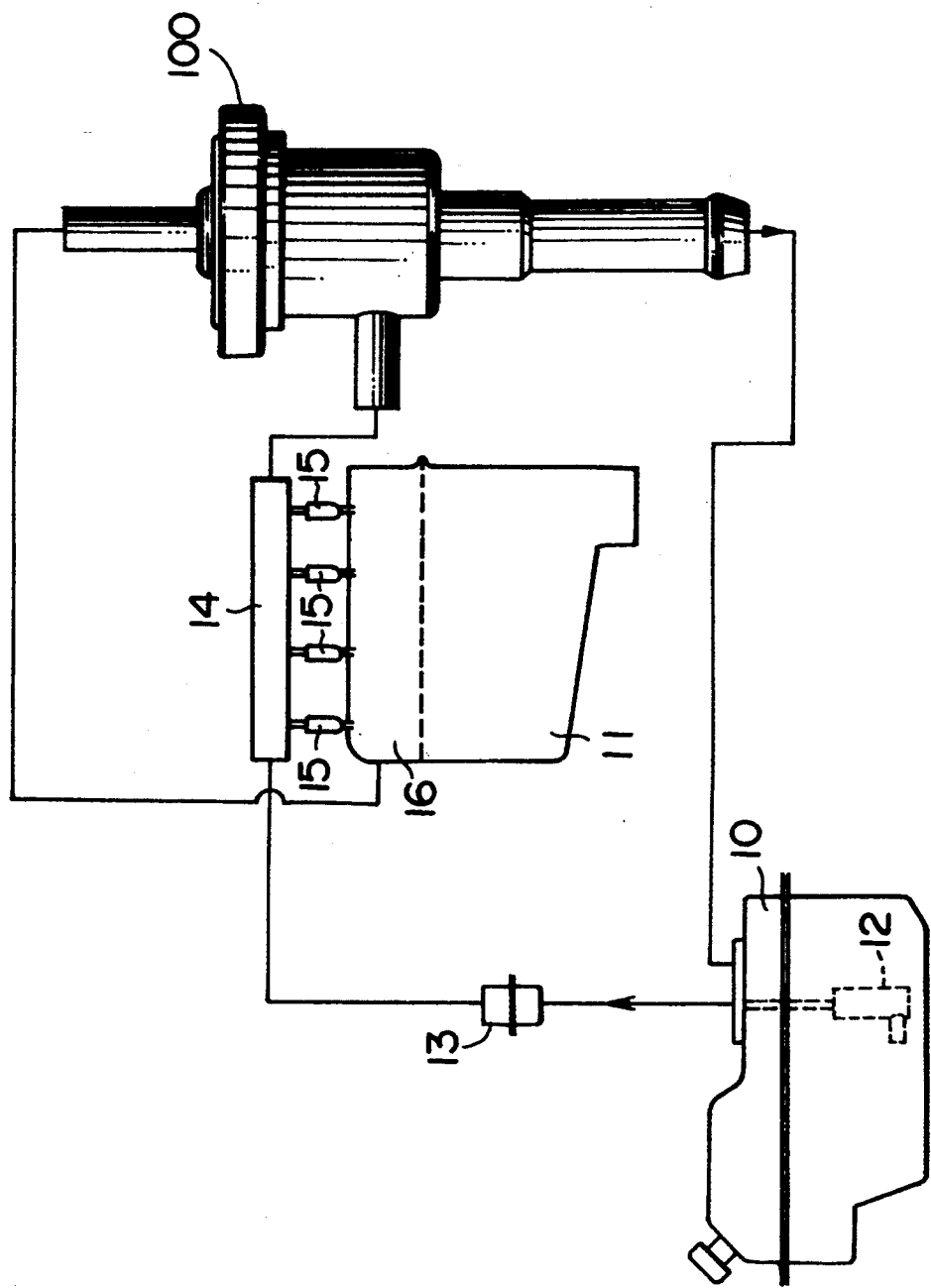
FIG. 1 is a schematic system view for illustrating a fuel pipeline system according to the present invention.

First, a fuel pipeline system of a spark ignition type internal combustion engine shown in FIG. 1, in which a fuel pressure regulating valve according to the present invention is equipped, will be described. In this fuel pipeline system, fuel in a fuel tank 10 is fed under pressure to an engine 11 and surplus fuel is returned to the fuel tank 10.

A fuel pump 12 serving to feed the fuel under pressure is disposed in the fuel tank 10 so that the fuel is delivered through a filter 13 to a fuel rail 14 attached to the engine 11. Injectors 15 are fixed to the fuel rail 14 so as to inject the fuel into an intake manifold 16 which communicates with every cylinder of the engine 11. Further, a fuel pressure regulating valve 100 of the present invention is attached to the fuel rail 14. The fuel pressure regulating valve 100 is communicated with the intake manifold 16 as well. And, the pressure in the intake manifold 16, that is, a suction pressure is introduced into the regulating valve 100.

Figure 2:
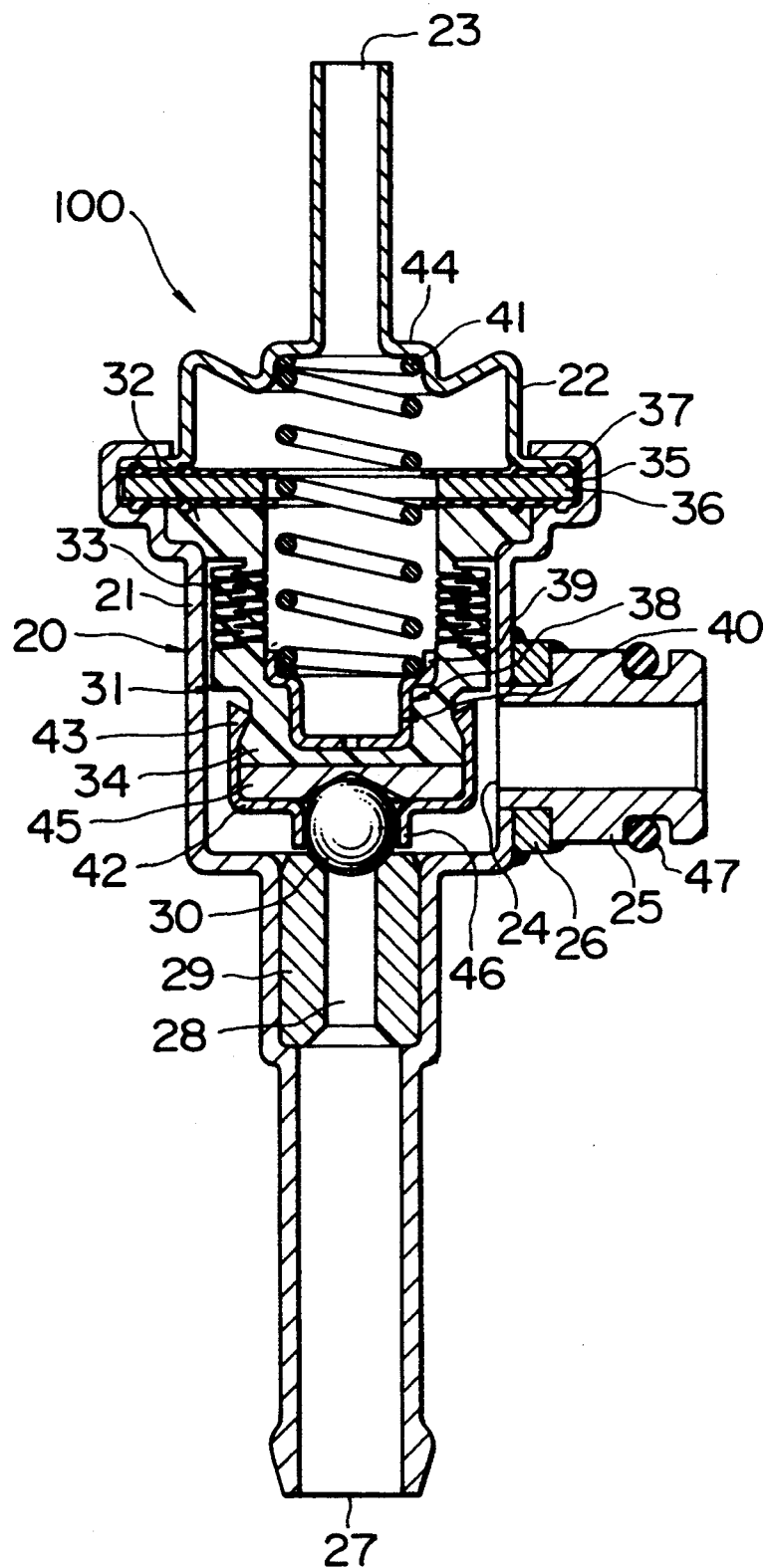
FIG. 2 is a sectional view of a first embodiment of a fuel pressure regulating valve according to the invention.

Now, description will be given of a construction of a first embodiment of the fuel pressure regulating valve 100 according to the present invention with reference to FIG. 2.

The pressure regulating valve 100 has a valve main body 20, and the valve main body 20 comprises a body 21 and a cover 22. The body 21 and the cover 22 are each formed in the shape of a stepped cylinder with openings at both ends. The body 21 has a large diameter portion, an intermediate diameter portion and a small diameter portion formed in the mentioned order as viewed from the top of FIG. 2, while the cover 22 has a small diameter portion and a large diameter portion formed in the mentioned order as viewed from the top of FIG. 2.

The large diameter portion of the cover 22 is fitted in an opening end of the large diameter portion of the body 21 so as to close the opening end. On the other hand, an opening of the small diameter portion of the cover 22 is communicated with the intake manifold 16 so that it serves as a suction pressure induction port 23 through which the suction pressure of the engine 11 is induced into the cover 22.

A fuel inlet port 24 is opened in the intermediate diameter portion of the body 21. A cylindrical connector 25 which is communicated with the fuel rail 14 is fixed to the inlet port 24 through a flange 26 used for fixing the connector 25 to the fuel rail 14. After the flange 26 is press-fitted on the connector 25, the connector 25 is press-fitted in the fuel inlet port 24. Then, the body 21 and the flange 26 are fixed to each other by welding, and the flange 26 and the connector 25 are fixed to each other by welding as well. The connector 25 is formed in an outer peripheral surface thereof with a groove in which an O ring 47 is inserted for serving as a fuel seal.

Further, an opening of the small diameter portion of the body 21 serves as a fuel outlet port 27 through which surplus fuel is returned to the fuel tank 10.

A cylindrical fixed valve seat 29 having a valve hole 28 formed therein is press-fitted and fixed in the body 21. In an opening portion of the valve hole 28 of the fixed valve seat 29, a seating surface for a ball valve 30, which is to be described later, is formed.

Further, a bellows 31 is provided in the body 21. The bellows 31 comprises a flanged cylinder portion 32 formed in the shape of a cylinder, an elastic portion 33 extending vertically from a lower end of the cylinder portion 32 and a bottomed cylinder portion 34 formed at a lower end of the elastic portion 33 so as to be in the form of a bottomed cylinder in the mentioned order as viewed from the top of FIG. 2. The bellows 31 is received as being in a state of substantially free length, and it contracts upwards in the drawing as spaces between a plurality of folds of the elastic portion 33 become narrower.

An annular disc plate seal 35 is disposed on an upper surface of the cylinder portion 32 of the bellows 31. The plate seal 35 comprises a reinforcing metallic annular disc 36 and a rubber 37 applied by baking to cover both surfaces of the disc 36. By plastically deforming the opening end of the large diameter portion of the body 21 so as to cover the flange portion of the cylinder portion 32, the outer peripheral portion of the plate seal 35 and the cover 22, the various members are fixed to become a unit body. In this state, the plate seal 35 serves to prevent the fuel coming in through the connector 25 from leaking into the cover 22 or leaking out of the valve main body 20.

The thickness of the elastic portion 33 of the bellows 31 is about 0.2 mm, and the outermost diameter of the elastic portion 33 is set to be about 16 mm when it contracts to the utmost limit. Accordingly, the bellows 31 is so formed as to keep a predetermined clearance between an inner peripheral surface of the body 21 and a portion of the elastic portion 33 where the width is the largest when it contracts to the utmost limit, and this clearance is set to be in the range of tens to hundreds of $\mu$m. Therefore, the bellows 31 can operate stably without coming in contact with the inner peripheral surface of the body 21.

In addition, a metallic stepped cylindrical spring seat 38 is press-fitted in a concave portion of the bottomed cylinder portion 34 of the bellows 31. The spring seat 38 comprises a stepped portion 39 and a small diameter cylinder portion 40 extending downwards from the stepped portion 39 in the drawing. The stepped portion 39 functions as a seat portion for receiving a spring 41 to be described later. On the other hand, the small diameter cylinder portion 40 is so formed as to be opposite to a caulking portion 43, which is a fixing portion of a ball valve retainer 42 to be described later, through a side wall of the bottomed cylinder portion 34. Incidentally, the thickness of a bottom wall of the bottomed cylinder portion 34 is smaller than that of the side wall thereof as shown in the drawing.

The spring 41 is disposed between the stepped portion 39 of the spring seat 38 and a stepped portion 44 of the cover 22 so that the bottomed cylinder portion 34 of the bellows 31 is biased downwards in the drawing.

Moreover, the bottomed cylindrical ball valve retainer 42 which serves to receive a plate 45 and the ball valve 30 is provided below the bottomed cylinder portion 34. The ball valve retainer 42 is formed with an opening at a center of the bottom portion thereof, and conical pawls 46 are formed in this opening portion so as to project downwards. The length of the pawl 46 is set to be in the range of about 1 to 2 mm and the diameter thereof is made smaller gradually as going to the forward end thereof. The ball valve retainer 42 has the caulking portion 43 which is to be fixed by caulking to the side wall of the bottomed cylinder portion 34. In this case, the plate 45 is held between the bottomed cylinder portion 34 and the ball valve retainer 42 so as to be fixed. Further, the ball valve 30 is held by a conical concave portion formed in a bottom surface of the plate 45 and by the pawls 46 described above. The ball valve 30 partially projects downwards beyond the pawls 46 so as to face to the seating surface of the aforesaid fixed valve seat 29. Incidentally, the ball valve 30 may be held rotatably between the plate 45 and the pawls 46.

It is noted here that the seating surface of the fixed valve seat 29 is formed with a taper of 60°~120°. By so forming the seating surface, even when the ball valve 30 is lifted from a seating position up to the utmost limit (the maximum lift amount being 0.5 mm in the present embodiment), it is possible to prevent the ball valve 30 from moving upwards beyond an upper surface of the seating surface of the fixed valve seat 29. Accordingly, it is possible to restrain the bellows 31 from being vibrated or bent in the radial direction of the body 21 by the fuel coming in through the connector 25.

Incidentally, among the various members described above, the rubber 37 for forming the plate seal 35 is fluororubber, the bellows 31 is made of PTFE (polytetrafluoroethylene) resin, the annular disc 36 for forming the plate seal 35, the plate 45, the ball valve retainer 42, the ball valve 30 and the fixed valve seat 29 are made of stainless steel, and the other members are made of carbon steel. The members made of carbon steel are subjected to the surface treatment. Further, the carbon steel members may be made of stainless steel.

In addition, the bellows 31 may be made of FEP (perfluoroethylene-propylene) resin, PFA (perfluoroalcoxy) resin, ETFE (polyethylene tetrafluoroethylene) resin or the like.

Next, description will be given of the order of assembling the fuel pressure regulating valve.

First, the spring seat 38 is press-fitted in the concave portion of the bottomed cylinder portion 34 of the bellows 31. The ball valve 30 and the plate 45 are inserted in the ball valve retainer 42 and the caulking portion 43 is fixed by caulking to the side wall of the bottomed cylinder portion 34 of the bellows 31. Subsequently, the connector 25 on which the flange 26 is press-fitted beforehand is inserted in the fuel inlet port 24 of the body 21 and then fixed by welding. Then, the body 21 having assembled as described above is subjected to the surface treatment such as non-electrolytic Ni plating and, thereafter, the fixed valve seat 29 is press-fitted in the body 21. Subsequently, the bellows 31 having assembled with the ball valve 30, the plate 45, the ball valve retainer 42 and the spring seat 38 is press-fitted in the body 21. Further, after the plate seal 35 and the cover 22 are inserted, the opening end of the large diameter portion of the body 21 is fixed by caulking. Then, a pressure gauge is disposed upstream of the connector 25 and the fuel is introduced through the connector 25. Thereafter, the stepped portion 44 of the cover 22 is pressed down and deformed to cause the spring 41 to contract until the pressure gauge indicates the preset pressure, thereby adjusting the set force to be applied to the ball valve 30 by the spring 41 to the predetermined value.

Next, operation of the fuel pressure regulating valve will be described.

The differential pressure between the pressure in the intake manifold 16 (suction pressure) and the pressure of the fuel to be supplied to the injectors 15 is set to a predetermined pressure based on the set force of the spring 41 set for the ball valve 30 at the time of the aforesaid assembling. The fuel pressure regulating valve 100 serves to regulate the pressure to this predetermined pressure. For example, in case that the differential pressure between the suction pressure and the pressure of the fuel supplied to the injector becomes larger than the predetermined pressure, the pressure force to the bellows 31 becomes larger than the compressive force of the spring 41. Accordingly, the elastic portion 33 of the bellows 31 is caused to contract, resulting in that a passage area defined between the ball valve 30 and the fixed valve seat 29 is increased. Then, fuel is returned to the fuel tank 10, so that the aforesaid differential pressure is reduced. On the other hand, as the differential pressure becomes smaller than the predetermined pressure, the pressure force to the bellows 31 becomes smaller than the compressive force the spring 41. Then, the elastic portion 33 of the bellows 31 is caused to expand, with a result that the passage area defined between the ball valve 30 and the fixed valve seat 29 is decreased to thereby increase the differential pressure. After repeating such operations, the differential pressure is regulated to the predetermined pressure.

In the pressure regulating valve 100 described above, the small diameter cylinder portion 40 of the spring seat 38 is so positioned as to be opposite to the caulking portion 43 of the ball valve retainer 42 through the side wall of the bottomed cylinder portion 34. So, the bottomed cylinder portion 34 of the bellows 31 is particularly reinforced in the radial direction. Therefore, the bottomed cylinder portion 34 can obtain a high strength against the caulking of the caulking portion 43.

As described above, owing to the small diameter cylinder portion 40, the bottomed cylinder portion 34 of the resinous bellows 31 can obtain the high strength against the caulking of the caulking portion 43. As a result, the bottom wall of the bottomed cylinder portion 34 of the bellows 31 can be made thinner than the side wall thereof as shown in the drawing. Accordingly, the thickness of the bottom wall of the bottomed cylinder portion 34 can be reduced. Therefore, it is possible to suppress the dimensional change of the bottom wall caused due to thermal expansion and, hence, it is possible to restrain the set force change of the spring 41 caused due to this dimensional change. In consequence, it is possible to prevent the preset pressure from being changed, thereby making it possible to improve the performance and reliability of the pressure regulating valve 100.

Further, owing to the small diameter cylinder portion 40, it is also possible to prevent the ball valve retainer 42 from slipping or coming off the bellows 31 when the stress applied to the bottomed cylinder portion 34 by the caulking of the caulking portion 43 is reduced due to creep deformation of the resin material of the bellows 31. In addition, since it is possible to prevent the ball valve retainer 42 from slipping off the bellows 31 due to creep deformation as described above, it is possible to prevent the preset pressure from being changed as well.

Besides, in the above embodiment, the spring seat 38 is formed such that the small diameter cylinder portion 40 extends downwards from the stepped portion 39. For this reason, as compared with the case that a spring seat which is a simple cylindrical member with no stepped portion 39 is inserted in the concave portion of the bottomed cylinder portion 34, in case of using the spring seat 38 of the above embodiment, the side wall of the bottomed cylinder portion 34 to which the caulking portion 43 is to be caulked can have a larger thickness in the radial direction. Accordingly, it is possible to prevent the side wall of the bottomed cylinder portion 34 from being deformed due to insufficient thickness when caulked by the caulking portion 43.

Moreover, the spring seat 38 of the above embodiment can be formed in a unit body simply by means of deep drawing or the like. Therefore, the spring seat 38 can be manufactured at low cost.

Incidentally, in the above embodiment, it is confirmed that the bottom wall of the bottomed cylinder portion 34 can be reduced in thickness to be not greater than 2 mm and that the change of preset pressure can be controlled not be exceed ±1%.

Next, description will be given of second, third, fourth, fifth and sixth embodiments of the present invention. In these embodiments, structures the same as or equal to those of the first embodiment are designated by the same reference numerals, and the point of difference will be described mainly.

Figure 3:
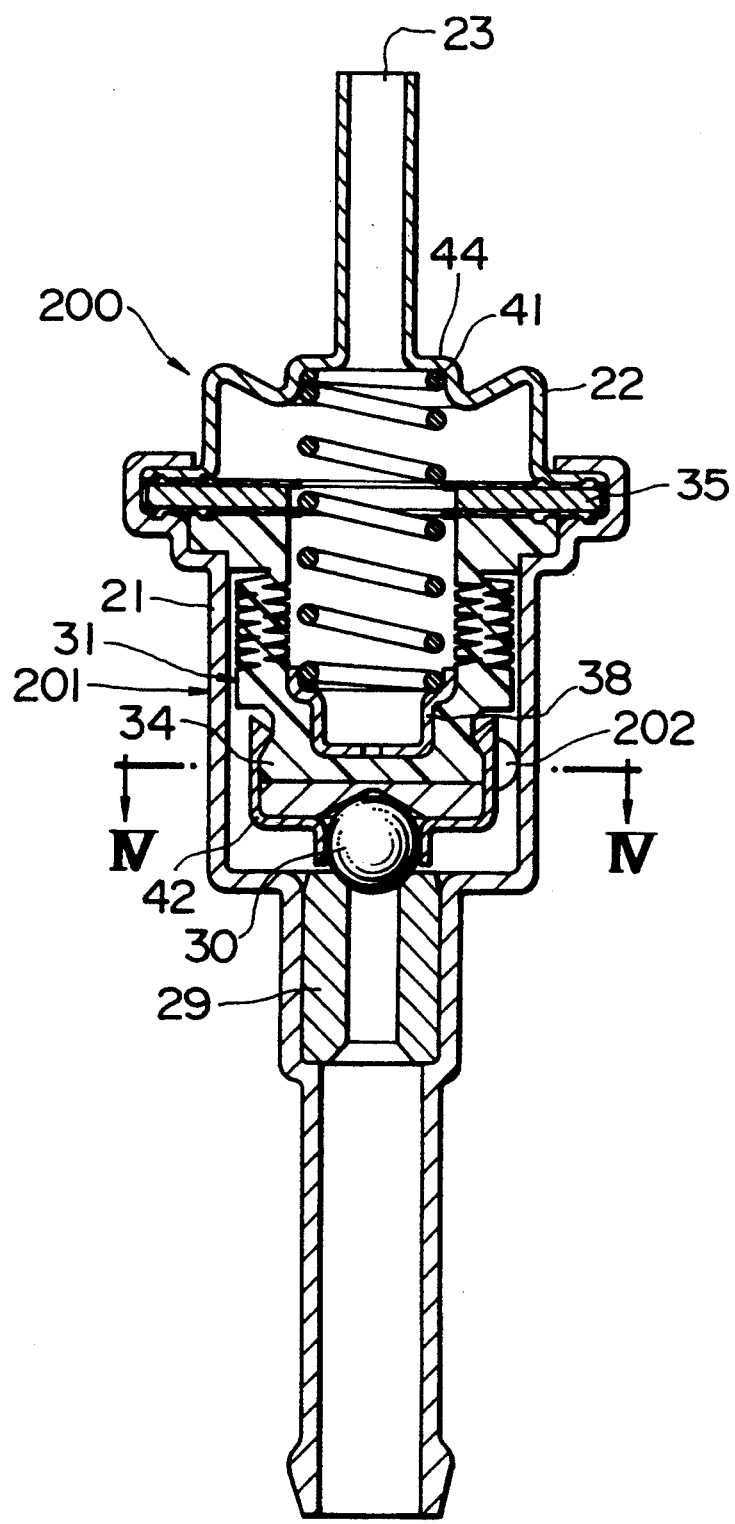
FIG. 3 is a sectional view of a second embodiment of a fuel pressure regulating valve according to the invention.
Figure 4:
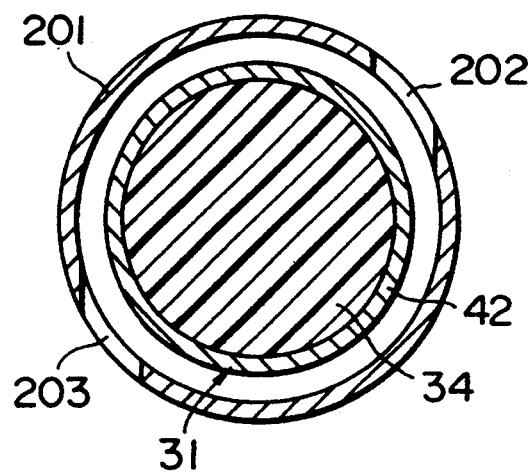
FIG. 4 is a sectional view taken along line IV—IV in FIG. 3.

Referring to FIGS. 3 and 4 showing a second embodiment of a fuel pressure regulating valve according to the invention, a body 201 is formed in an intermediate diameter portion thereof with two inlet ports 202 and 203 through which the fuel is made to come in from the fuel rail 14. These inlet ports 202 and 203 are opened so as to extend along the tangential direction of the body 201. The inlet ports 202 and 203 serve to guide the fuel to flow in the tangential direction of an inner peripheral surface of the body 21 so as to form a swirl. Accordingly, it is possible to prevent the fuel coming in through the inlet ports 202 and 203 from colliding directly against the bellows 31 and the ball valve 30. In consequence, it is possible to eliminate the problem that the expansion and contraction of the bellows 31 is hindered or the ball valve 30 slips out of the seating position on the fixed valve seat 29 owing to the displacement, vibration and bending of the bellows 31 in the radial direction of the body 201.

Figure 5:
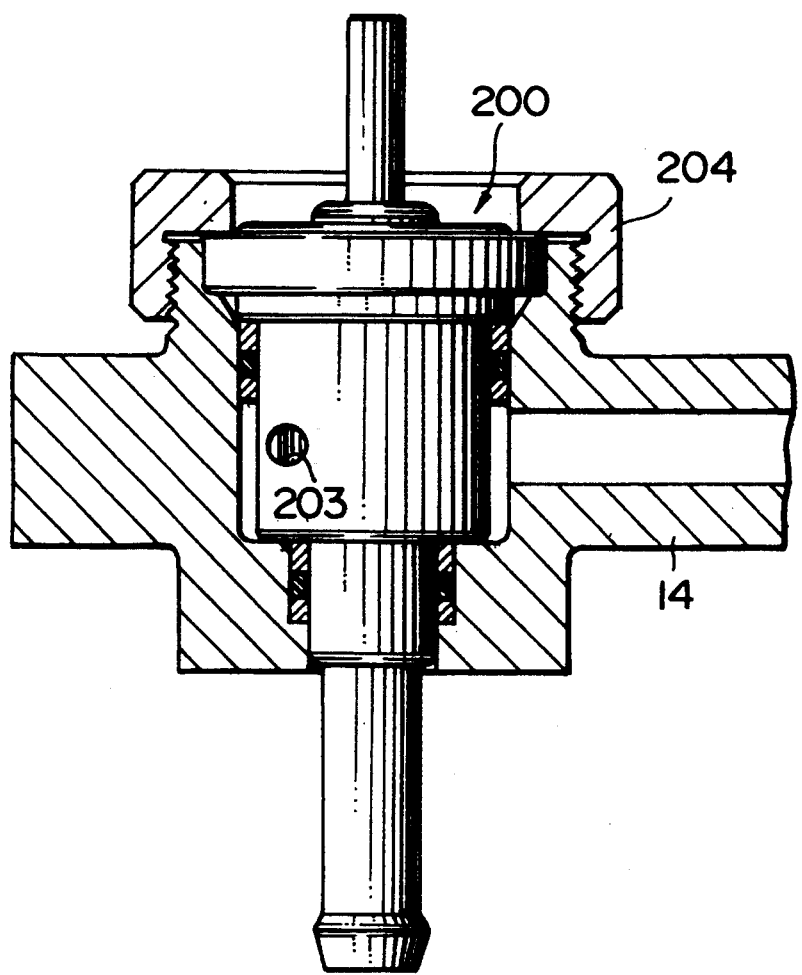
FIG. 5 is a particle sectional view for illustrating a state of fixing of the second embodiment of the fuel pressure regulating valve.

Incidentally, the fuel pressure regulating valve 200 is attached to the fuel rail 14 by means of an annular screw member 204 as shown in FIG. 5.

Further, the number of inlet ports 202, 203 is not limited to two but may be increased still more.

Figure 6:
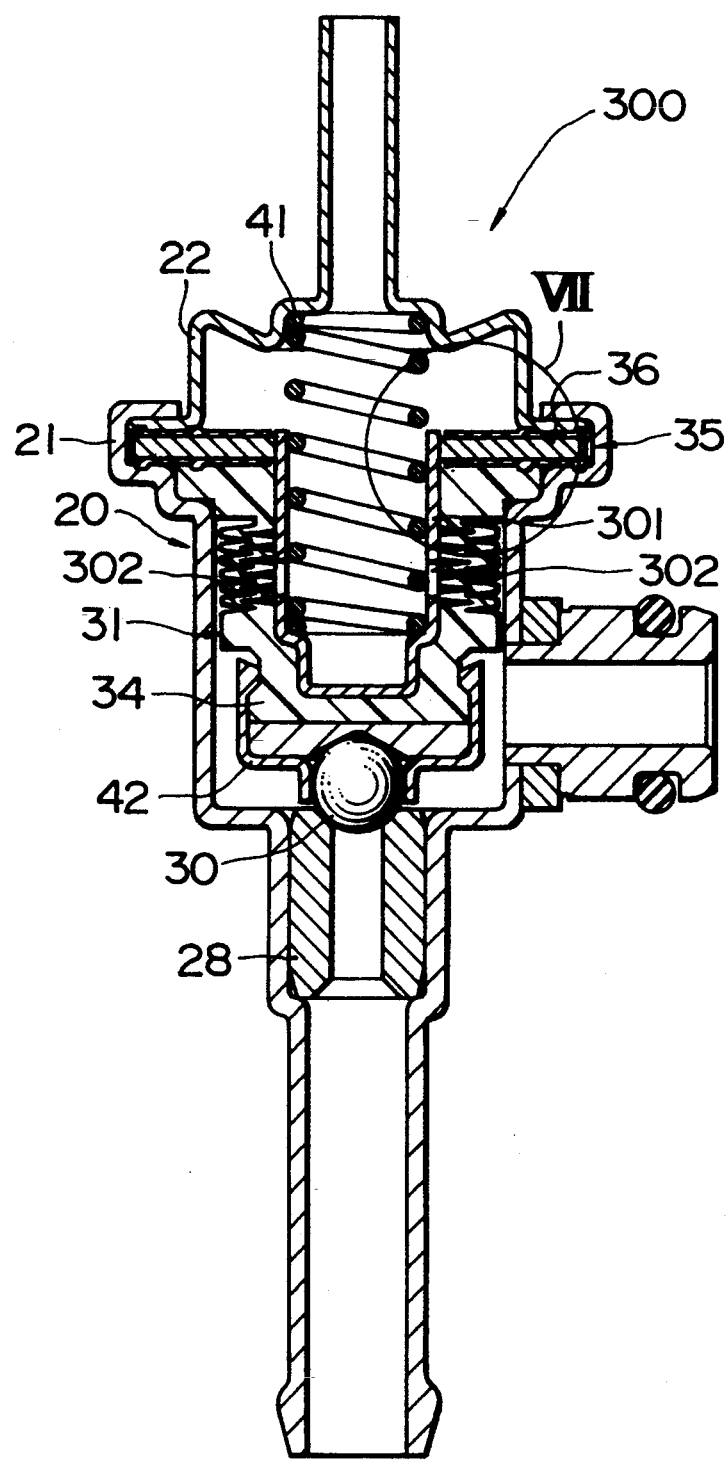
FIG. 6 is a sectional view of a third embodiment of a fuel pressure regulating valve according to the invention.
Figure 7:
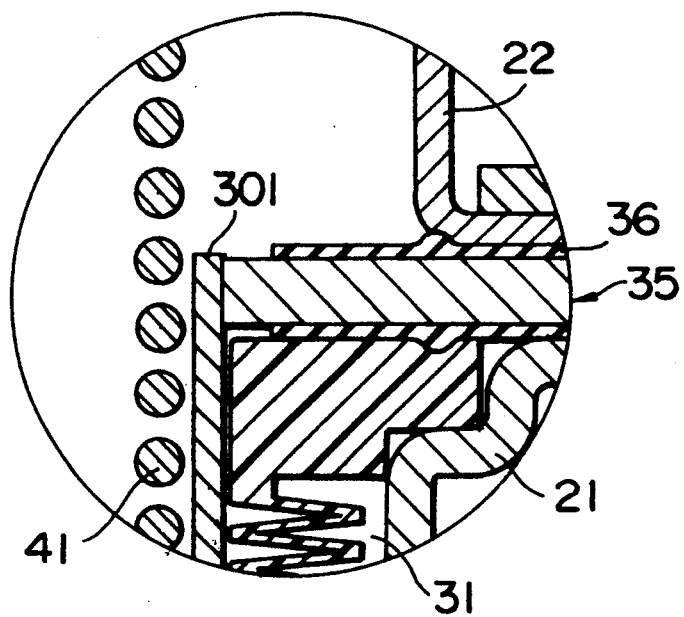
FIG. 7 is an enlarged view of a section VII in FIG. 6.

Next, the third embodiment will be described with reference to FIGS. 6 and 7.

In the third embodiment, a spring seat 301 fixed in the bottomed cylinder portion 34 of the bellows 31 is so formed as to extend up to an inner peripheral surface of the annular disc 36 of the plate seal 35. The spring seat 301 is brought into contact with the inner peripheral surface of the annular disc 36 while being enabled to slide in the axial direction of the body 21. By so doing, the spring seat 301 is guided by the annular disc 36 of the plate seal 35, and therefore, it is possible to prevent the bellows 31 from being displaced, vibrated and bent in the radial direction of the body 21.

Further, since the sliding portion between the spring seat 301 and the annular disc 36 is formed in the cover 22 which serves to introduce the suction pressure, it is possible to prevent chips and dust contained in the fuel from getting in the sliding portion to hinder the sliding movement of the bellows 31.

Incidentally, the spring seat 301 is formed in the side wall thereof with a plurality of holes 302 so that the suction pressure introduced into the cover 22 is applied to the elastic portion of the bellows 31.

Figure 9:
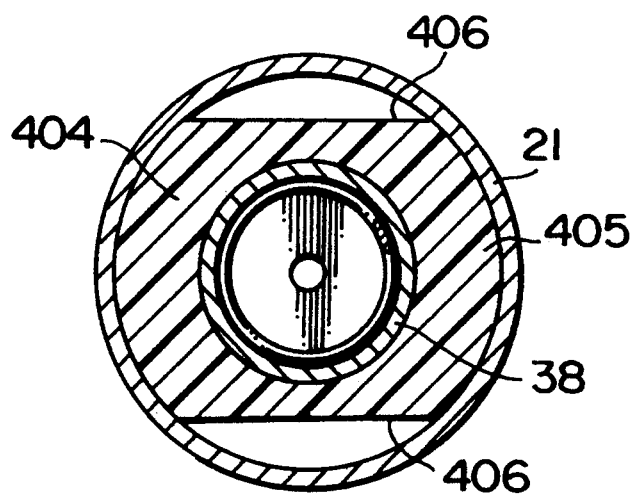
FIG. 9 is a sectional view taken along line IX—IX in FIG. 8.
Figure 8:
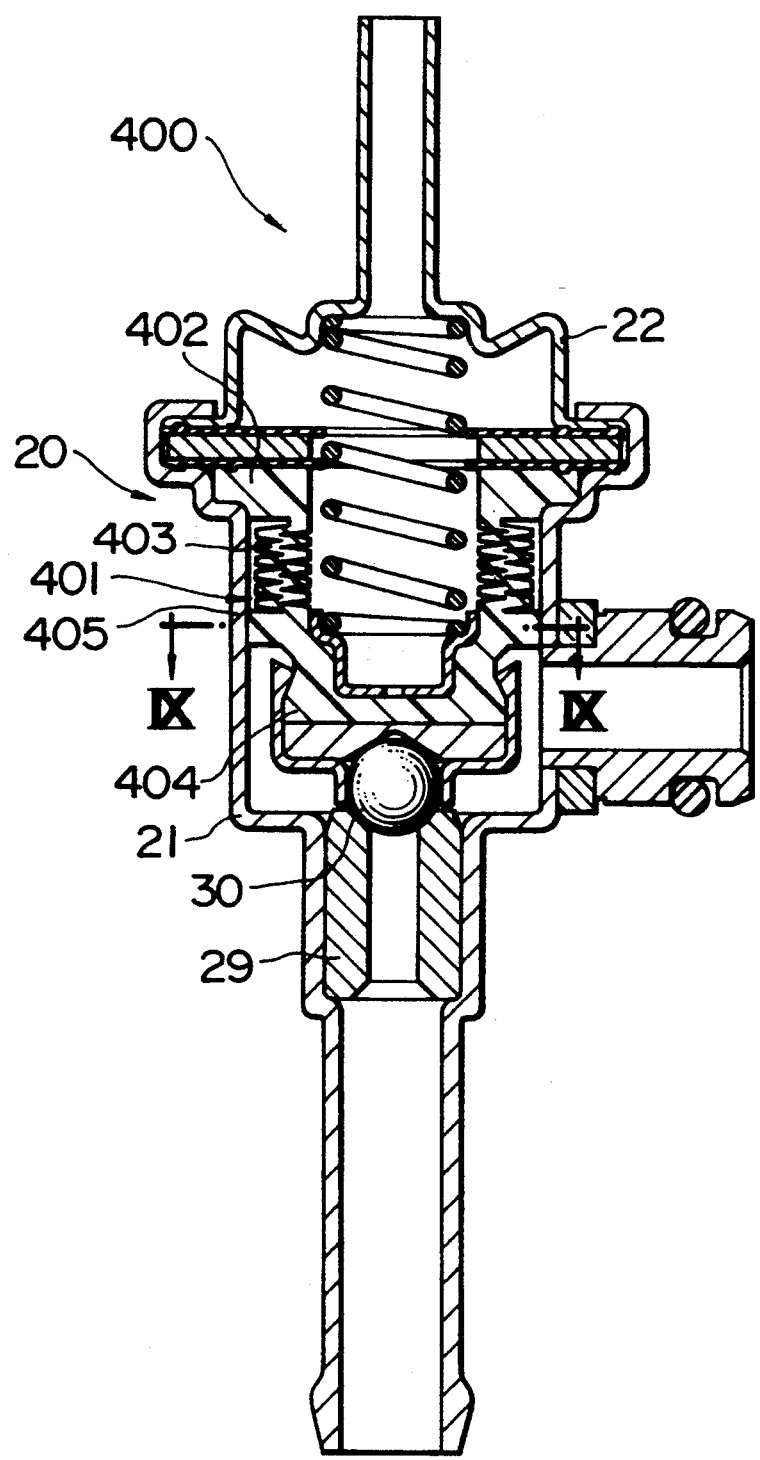
FIG. 8 is a sectional view of a fourth embodiment of a fuel pressure regulating valve according to the invention.

Next, description will be given of a fourth embodiment with reference to FIGS. 8 and 9.

In the fourth embodiment, a contacting portion of a bottomed cylinder portion 404 of a bellows 401 is brought into contact with the body 21 so as to be slidable in the axial direction. Further, as shown in FIG. 9, notches 406 and 407 are formed in the contacting portion 405 of the bottomed cylinder portion so that the fuel coming in from the fuel rail 14 is enabled to act on an elastic portion 403 of the bellows 401.

For this reason, the bellows 401 comprises a cylinder portion 402, the elastic portion 403, the bottomed cylinder portion 404 and the contacting portion 405. In consequence, since the bellows 401 is guided by the inner peripheral surface of the body 21, it is possible to prevent the bellows 401 from being displaced, vibrated and bent in the radial direction of the body 21.

According to the first to fourth embodiments described above, due to the cylindrical member provided inside of the bottom portion of the bellows, it is possible to reinforce particularly the bottom portion of the bellows in the radial direction. Accordingly, even in case that other member is engaged with the outer periphery of the bottom portion of the bellows, the resinous bellows can obtain a high strength in the direction of engagement.

Figure 10:
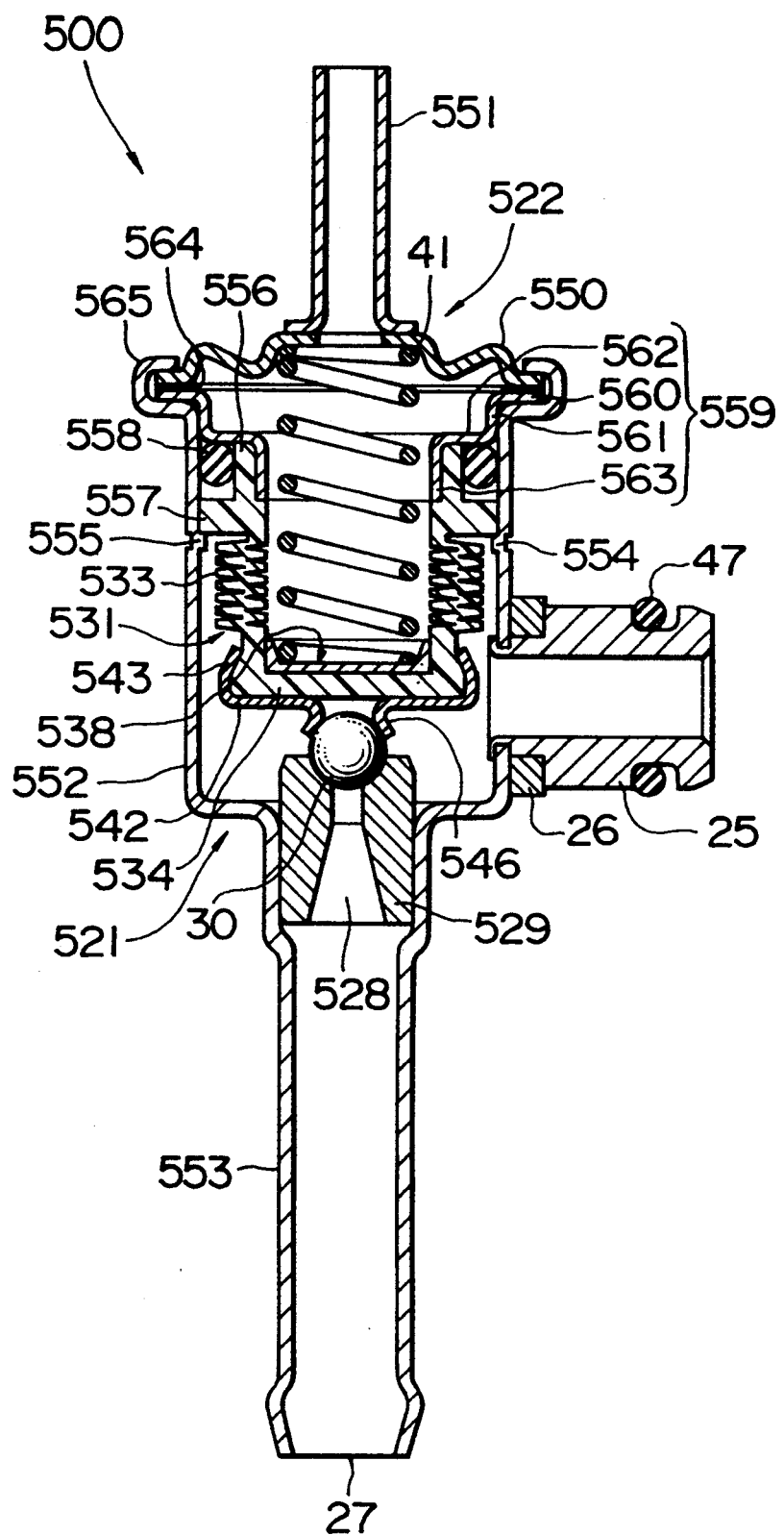
FIG. 10 is a sectional view of a fifth embodiment of a fuel pressure regulating valve according to the invention.

Next, description will be given of a fifth embodiment with reference to FIG. 10.

In the fifth embodiment, structures the same as or equal to those of the first embodiment are designated by the same reference numerals, and description will be given of the point of difference mainly.

In the fifth embodiment, a cover 522 comprises a disc portion 550 and a back pressure pipe portion 551, and the back pressure pipe 551 is welded to a central opening portion of the disc portion 550. The back pressure pipe 551 is communicated with the intake manifold 16.

A body 521 comprises a cylindrical fuel chamber portion 552 and a tube portion 553, and the fuel chamber portion 552 is formed with a plurality of projections 554 and 555 pressed inwards from the outer periphery. These projections 554 and 555 serve to define an axial position of a bellows 531.

Further, a fixed valve seat 529 is formed with a valve hole 528 the sectional area of which is increased as going toward downstream, so that the fuel passing through the valve hole 528 is smoothly released to a low pressure side as the pressure is reduced gradually.

In addition, the fifth embodiment is differed from the first embodiment in the shape of the bellows 531, in the fixing structure of the bellows 531 and in the shape of a spring seat 538.

The bellows 531 comprises a cylinder portion 556, a flange portion 557, an elastic portion 533 and a bottomed cylinder portion 534 in the mentioned order as viewed from the top of the drawing.

A dished spring seat 538 is received inside of the bottomed cylinder portion 534 of the bellows 531. Further, a ball valve retainer 542 is fitted on an outside of the bottomed cylinder portion 534 and a caulking portion 543 is bent inwardly. In this embodiment as well, the spring seat 538 is located inside of the caulking portion 543 so as to reinforce the bottomed cylinder portion 534 of the bellows 531. The ball valve retainer 542 supports the ball valve 30 by means of pawls 546.

The flange portion 557 of the bellows 531 is in contact with the inner wall of the body 521 and, further, it is kept in contact with the projections 554 and 555 so as to define the axial position of the bellows 531.

An O ring 558 is disposed between the cylinder portion 556 of the bellows 531 and the inner wall of the body 521 so as to prevent the leakage of fuel. A plate 559 is provided inside of the cylinder portion 556 of the bellows 531 so as to reinforce the cylinder portion 556 of the bellows 531, thereby increasing the fuel sealing characteristic attributable to the O ring 558.

The plate 559 is formed in the shape of a stepped cylinder, and the outermost periphery thereof is fixed by a caulking portion 565 of the body 521 together with the outer periphery of the disc portion 550 of the cover 522 and a gasket 564. The plate 559 comprises an annular fixing portion 560 which is to be gripped by the caulking portion 565, an extension portion 561 extending from the fixing portion 560 in the axial direction, a pressure plate portion 562 extending radially inwardly from the extension portion 561, and a reinforcing portion 563 extending from the pressure plate portion 562 in the axial direction and located inside of the cylinder portion 556.

It is noted here that the pressure plate portion 562 of the plate 559 serves to press down the bellows 531 from above as viewed in the drawing. Accordingly, the bellows 531 is held between the pressure plate portion 562 and the projections 554, 555 so as to be located in the axial direction. As described above, the plate 559 has two functions, that is, to reinforce the bellows 531 and to fix the bellows 531.

According to the embodiment since the plate 559 is provided, the cylinder portion 556 of the bellows 531 can be reduced in thickness. In the present embodiment, the thickness of the cylinder portion is reduced to be in the range of about 1 to 2 mm. Therefore, this embodiment can have a construction that is hardly affected by thermal expansion, swelling and the like. Moreover, since the plate 559 is provided on the inner peripheral side of the cylinder portion 556 the thickness of which is reduced as described above, the strength of the cylinder portion 556 in the radial direction can be insured with reliability.

Figure 11:
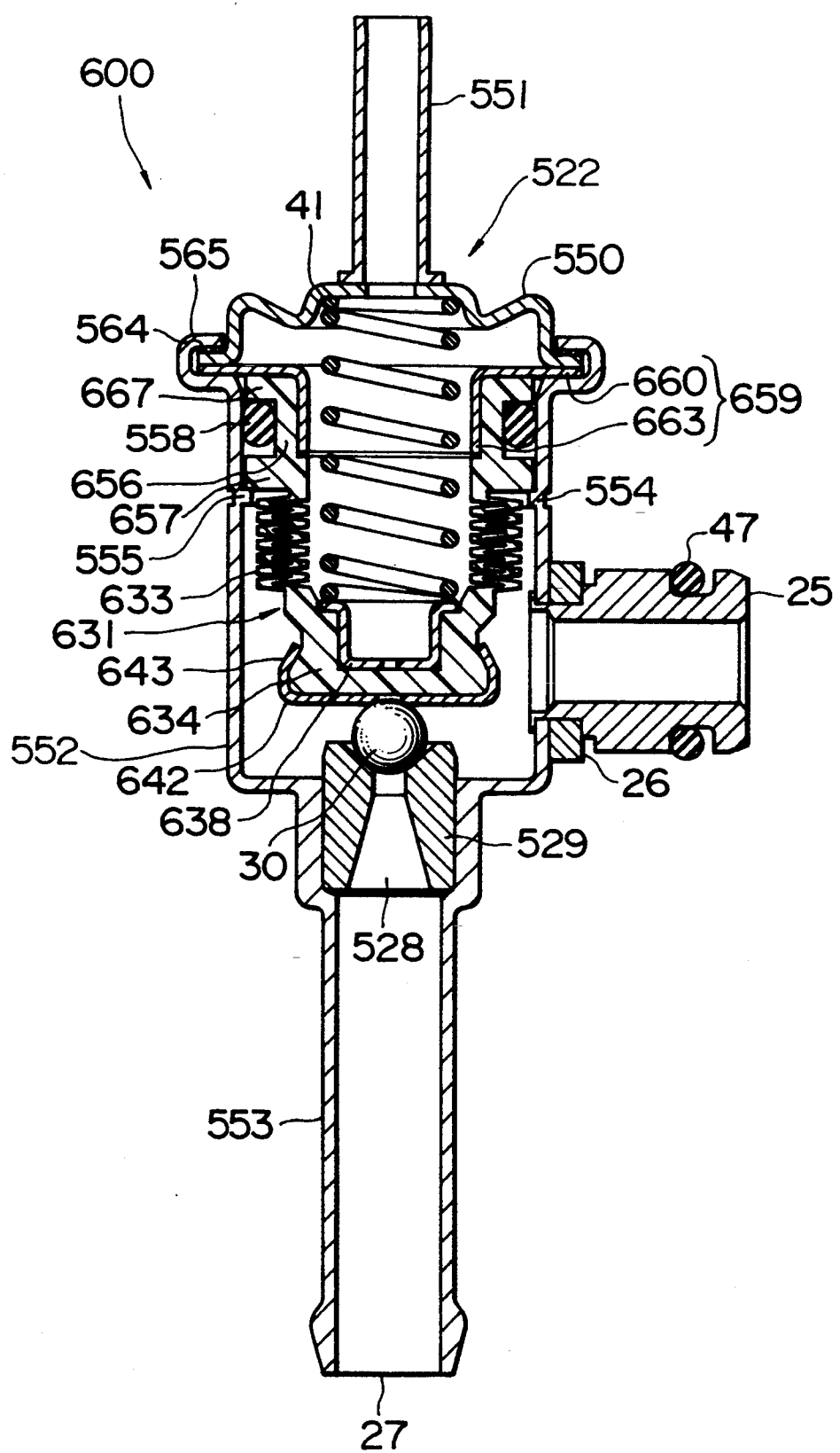
FIG. 11 is a sectional view of a sixth embodiment of a fuel pressure regulating valve according to the invention.
Figure 12:
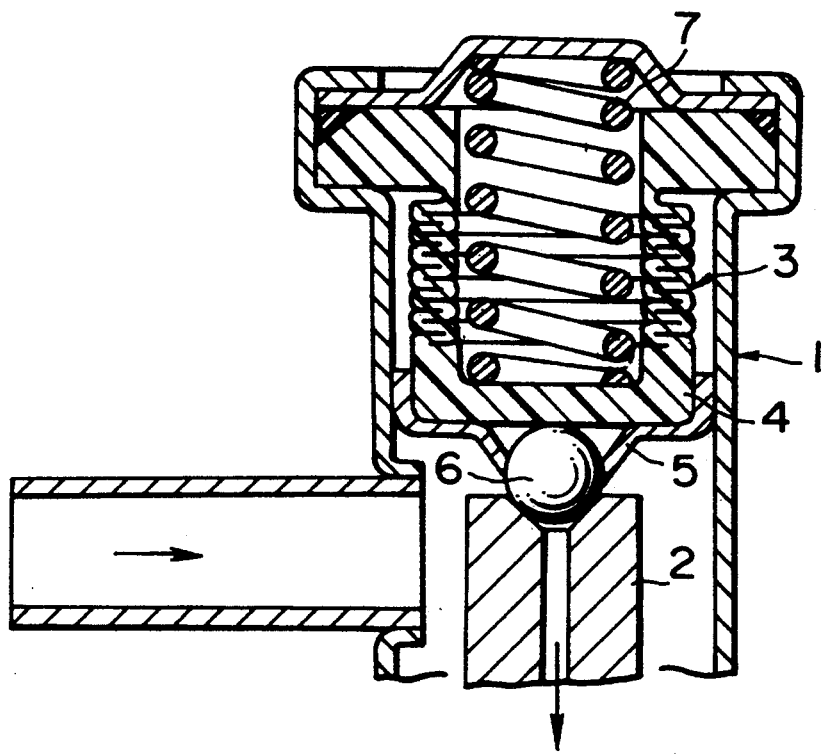
FIG. 12 is a sectional view of a prior art pressure regulating valve.

Next, description will be given of a sixth embodiment with reference to FIG. 11.

The sixth embodiment is a modified form of the fifth embodiment. Hereinafter, structures the same as or equal to those of the fifth embodiment are designated by the same reference numerals, and description will be given of the point of difference mainly.

In the sixth embodiment, the fixing structure of the O ring 558, the shape of a plate 659, the shape of a spring seat 638, and the fixing structure of the ball valve 30 are modified.

First, a flange portion 667 is formed at an end portion of a cylinder portion 656 of a bellows 631 so that the O ring 558 can be held with reliability. Incidentally, the bellows 631 comprises a cylinder portion 656, a flange portion 657, an elastic portion 633 and a bottomed cylinder portion 634 like the aforesaid embodiment.

Further, the plate 659 is formed in a simple shape comprising a fixing portion 660 and a strengthening portion 663, thereby promoting the reduction of cost.

In addition, the configurations of the spring seat 638 and the bottomed cylinder portion 634 of the bellows 631 are similar to those of the first embodiment. The spring seat 638 comprises an annular portion serving to receive the spring 41 and a cup portion extending from this annular portion in the axial direction, while an inside of the bottomed cylinder portion 634 of the bellows 631 is formed in the shape of a cone in order to make it easy to fit in the spring seat 638.

Moreover, the ball valve 30 is welded directly to a center of a ball valve retainer 642.

Further, the attaching position of the gasket 564 is changed from that of the fifth embodiment.

Incidentally, among the various members described above, the O ring is made of fluororubber, and the gasket is made of NBR (nitrile-butadiene rubber).

According to the fifth and sixth embodiments described above, the plate 559, 659 is provided so as to be in contact with the inner peripheral side of the cylinder portion 556, 656 forming the opening end of the bellows 531, 631. By so doing, the radial strength of the opening end of the bellows 531, 631 can be insured with reliability. Further, since the radial strength of the cylinder portion 556, 656 can be obtained, the sealing characteristic attributable to the O ring 558 can be insured with reliability.

Particularly, in case of regulating the pressure of alcohol mixed gasoline, the O ring 558 is caused to swell, and however, since the cylinder portion 556, 656 is reinforced, deformation of the cylinder portion 556, 656 can be prevented even against the swelling of the O ring 558.

Further, since the thickness of the cylinder portion 556, 656 of the bellows 531, 631 is reduced to be in the range of 1 to 2 mm, it is possible to decrease the effect of expansion and contraction due to heat or the effect of swelling due to solvent or the like contained in the fuel.

What is claimed is:

1. A pressure regulating valve in which a valve body is driven by a bellows formed in the shape of a bottomed cylinder, said valve comprising:

a valve seat disposed opposite to a bottom portion of said bellows;

a valve body provided on an outside of the bottom portion of said bellows so as to come in and out of contact with said valve seat due to expansion and contraction of said bellows;

a valve body retaining member provided on the outside of the bottom portion of said bellows and having an engaging portion used for the engagement with an outer peripheral wall portion of said bellows, said valve body retaining member serving to retain said valve body at the bottom portion of said bellows by being fixed to the outer periphery of the bottom portion of said bellows by means of said engaging portion;

a reinforcing member provided inside of the bottom portion of said bellows and located so as to be opposite to said engaging portion through a peripheral wall portion of said bellows; and a spring disposed inside of said bellows and serving to bias said bellows in the direction of expansion of said bellows, said reinforcing member including a portion for receiving said spring, wherein said reinforcing member comprises an annular disc portion serving to receive said spring and a cylindrical portion extending from said disc portion in the axial direction so as to be opposite to said engaging portion through the peripheral wall portion of said bellows.

2. A pressure regulating valve according to claim 1, wherein said reinforcing member is formed in the shape of a stepped cylinder.

3. A pressure regulating valve according to claim 1, wherein a thickness of the bottom of said bellows which is opposed to said valve seat is smaller than that of the peripheral wall portion thereof located between said reinforcing member and said engaging portion.

4. A pressure regulating valve according to claim 1, further comprising:
 a plate having a reinforcing portion extending from an opening end of said bellows to the inside of the same so as to reinforce the opening end of said bellows and a fixing portion extending from the opening end of said bellows radially outwardly; and
 a cylindrical body to which the fixing portion of said plate is fixed so as to define the axial position of said bellows by said plate and which cooperates with the reinforcing portion of said plate to hold the opening end of said bellows between them.

5. A pressure regulating valve according to claim 4, wherein the opening end of said bellows and an O ring are held between said cylindrical body and the reinforcing portion of said plate.

6. A pressure regulating valve which regulates the pressure of fluid by opening and closing a passage leading to a low pressure side in response to the pressure of fluid, said valve comprising:
 a bellows formed in the shape of a bottomed cylinder and having a cylindrical wall which expands and contracts;
 a fixing member for fixing an opening end of said bellows;
 a valve seat disposed opposite to a bottom portion of said bellows;
 a valve body provided on an outside of the bottom portion of said bellows so as to come in and out of contact with said valve seat due to expansion and contraction of said bellows;
 a valve body retaining member provided on the outside of the bottom portion of said bellows and having an engaging portion used for the engagement with an outer peripheral wall portion of said bellows, said valve body retaining member serving to retain said valve body at the bottom portion of said bellows by being fixed to the outer periphery of the bottom portion of said bellows by means of said engaging portion;
 a spring disposed inside of said bellows and serving to bias said bellows in the direction of expansion; and
 a spring seat for receiving said spring provided inside of the bottom portion of said bellows and located so as to be opposite to said engaging portion through the peripheral wall portion of said bellows;
 wherein said spring seat comprises an annular disc portion serving to receive said spring and a cylindrical portion extending from said seat portion in the axial direction so as to be opposite to said engaging portion through the outer peripheral wall portion of said bellows.

7. A pressure regulating valve according to claim 6, wherein said spring seat is formed in the shape of a stepped cylinder.

8. A pressure regulating valve according to claim 6, wherein a thickness of the bottom of said bellows which is opposed to said valve seat is smaller than that of the peripheral wall portion thereof located between said spring seat and said engaging portion.

9. A pressure regulating valve according to claim 6, wherein said bellows is formed at an opening end thereof with a flange portion extending radially outwardly, said flange portion being sandwiched by said fixing member in the axial direction of said bellows.

10. A pressure regulating valve according to claim 9, wherein a seal member serving to prevent fuel leakage is disposed between said fixing member and the flange portion of said bellows.

11. A pressure regulating valve according to claim 6, wherein said fixing member comprises a cylindrical body, an axial positioning member formed integrally with said body and serving to define the axial position of said bellows, and a plate fixed to said body so as to press down said bellows against said axial positioning member and brought into contact with the inner side of the opening end of said bellows so as to hold said bellows between said body and the plate.

12. A pressure regulating valve according to claim 11, wherein an O ring and said bellows are held between said body and said plate.

13. A pressure regulating valve in which a valve body is driven by a bellows formed in the shape of a bottomed cylinder, said valve comprising:
 a plate having a reinforcing portion extending from an opening end of said bellows to the inside of the same so as to reinforce the opening end of said bellows and a fixing portion extending from the opening end of said bellows radially outwardly; and
 a cylindrical body to which the fixing portion of said plate is fixed so as to define the axial position of said bellows by said plate and which cooperates with the reinforcing portion of said plate to hold said bellows between them,
 wherein an O-ring and said bellows are held between said body and said plate.

14. A pressure regulating valve according to claim 13, wherein said body is formed integrally with a positioning member for defining the axial position of said bellows so that said bellows is held between said plate and said positioning member so as to be fixed in the axial direction.

15. A pressure regulating valve according to claim 14, wherein said positioning member is a projection formed within said body.

* * * * *